A. W. BROWN.
PUMP BARREL.
APPLICATION FILED OCT. 25, 1920.
1,396,922.
Patented Nov. 15, 1921.
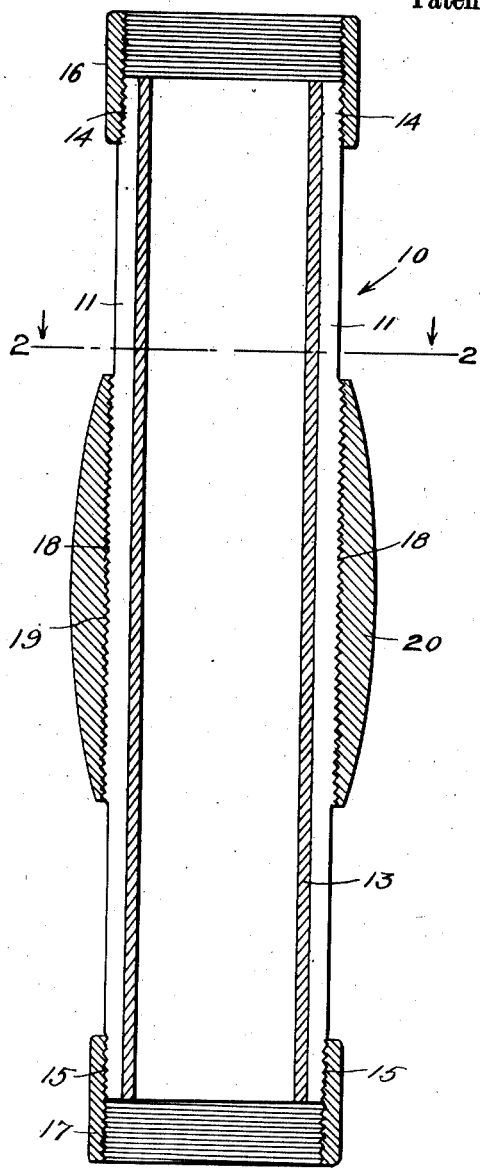
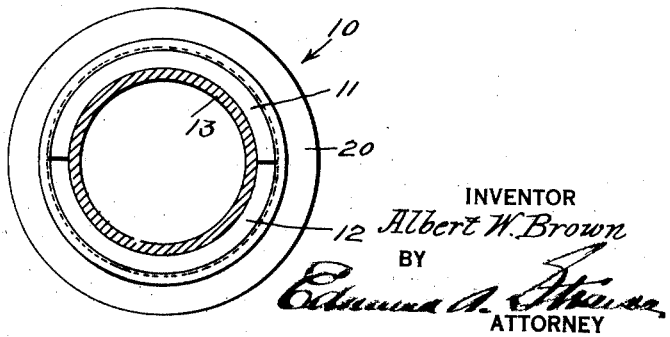
INVENTOR
Albert W. Brown
BY
ATTORNEY

UNITED STATES PATENT OFFICE.

ALBERT W. BROWN, OF FULLERTON, CALIFORNIA, ASSIGNOR TO CAROLINE H. R. BROWN, OF FULLERTON, CALIFORNIA.

PUMP-BARREL.

1,396,922.   Specification of Letters Patent.   Patented Nov. 15, 1921.

Application filed October 25, 1920. Serial No. 419,559.

*To all whom it may concern:*

Be it known that I, ALBERT WALDO BROWN, a citizen of the United States, residing at Fullerton, in the county of Orange and State of California, have invented new and useful Improvements in Pump-Barrels, of which the following is a specification.

My invention relates to pump barrels and a means for securing a lining therein and is particularly adapted to be used in oil well construction.

In the construction of pump barrels for use in oil wells it has been customary to form the barrel of an unfinished casting and to secure a finished bushing in the same, which constitutes a lining in which the piston of the pump reciprocates. When in use the rough and irregular space between the outer surface of the wall of the bushing and the inner surface of the wall of the pump barrel becomes filled with sand, and other deposits, and forms a wedge between these surfaces, and when it becomes necessary to renew the lining, it is very difficult to drive the old lining out, in fact the pump barrel very frequently bursts open during this operation, thus rendering the same worthless, thereby causing great loss of time as well as incurring considerable expense.

It is the object of my invention to overcome the above mentioned difficulty by providing a pump barrel formed in sections and means for clamping said sections around the lining bushing to form a reinforcement for the same, whereby a new lining bushing may be quickly inserted into the pump barrel and rigidly secured therein and may be readily removed from said pump barrel without destroying or injuring any of the parts.

Other objects will appear in the following description, will be pointed out in the claims and will be embodied in the accompanying drawings, in which:

Figure 1 is a vertical section through a pump barrel embodying my invention.

Fig. 2 is a transverse section, taken on the line 2—2 of Fig. 1, viewed in the direction indicated by the arrows.

Referring more specifically to the detail construction of my invention, 10 represents a pump barrel preferably comprising two members 11 and 12 formed of rough castings, semi-circular in cross section, which surrounds the lining bushing 13, and are adapted to be clamped therearound to form an outer reinforcing and protecting wall therefor.

The members 11 and 12 are threaded exteriorly at their opposite ends 14 and 15, in such manner that when they are assembled to surround the lining bushing 13, a continuous thread will be formed at these ends for the reception of the threaded pipe coupling members 16 and 17, which serve to clamp the barrel members to the lining bushing 13 at its ends, as well as to form a coupling for other pipe sections.

In order that the barrel members 11 and 12 may be clamped around the lining bushing 13 between its ends, the exterior diameters thereof are slightly enlarged as at 18, and are threaded as at 19, and a threaded sleeve 20 which is exteriorly tapered from its center toward both of its ends surrounds said members when properly assembled around the lining bushing, and engages with said threads.

By the above recited construction it will be observed that I have provided a pump barrel into which a lining bushing may be quickly inserted or removed therefrom, without encountering any of the previously mentioned difficulties, and by tapering the sleeve 20 in the manner shown and described, the barrel may be readily lowered into or withdrawn from the well without danger of the ends of the sleeve catching against the side of the well wall.

What I claim is:

1. A pump barrel, comprising a plurality of segmental members provided with registering threads on their peripheral surfaces adapted to surround a lining bushing, and a threaded sleeve surrounding said segmental members and engaged with said threads.

2. A pump barrel, comprising a plurality of segmental members provided with registering threads on their peripheral surfaces adapted to surround a lining bushing, and a threaded sleeve tapered exteriorly from its center toward both of its ends surrounding said segmental members and engaged with said threads.

In witness that I claim the foregoing I have hereunto subscribed my name.

ALBERT W. BROWN.

Witness:
H. L. USTICK.